United States Patent [19]
Brown et al.

[11] Patent Number: 5,576,609
[45] Date of Patent: Nov. 19, 1996

[54] CONSTANT POWER DISSIPATION CONTROL OF A LINEAR PASS ELEMENT USED FOR BATTERY CHARGING

[75] Inventors: Alan E. Brown, Georgetown; Farzad Khosrowpour, Austin, both of Tex.

[73] Assignee: Dell USA, L.P., Austin, Tex.

[21] Appl. No.: 425,177

[22] Filed: Apr. 20, 1995

[51] Int. Cl.$^6$ .................................................... H02J 7/10
[52] U.S. Cl. .................................. 320/30; 320/32; 320/53
[58] Field of Search ............................... 320/30, 53, 44, 320/32; 307/126

[56] References Cited

U.S. PATENT DOCUMENTS

| | | | |
|---|---|---|---|
| 4,472,672 | 9/1984 | Pacholok | 320/21 |
| 4,504,951 | 3/1985 | McMahan et al. | 372/38 |
| 4,644,247 | 2/1987 | Burmenko | 320/39 |

FOREIGN PATENT DOCUMENTS

| | | | |
|---|---|---|---|
| 6-245402 | 9/1994 | Japan | H02J 7/10 |

*Primary Examiner*—Peter S. Wong
*Assistant Examiner*—Patrick B. Law
*Attorney, Agent, or Firm*—Henry N. Garrana; Mark P. Kahler; Michelle M. Turner

[57] ABSTRACT

A battery charger including a control system for controlling a linear pass element to maintain relatively constant power dissipation of the linear pass element. In one embodiment, the charge current and the voltage across the linear pass element are provided to a constant dissipation amplifier, which increases the charge current as the voltage of the linear pass element decreases due to charging of the battery. The charge current is increased in such a manner to maintain the power dissipation of the linear pass element to a relatively constant level. In another embodiment, the battery voltage is provided to the amplifier, which increases charge current in response to rising battery voltage to maintain constant power dissipation of the linear pass element. The latter embodiment is in recognition that the voltage across the linear pass element is inversely proportional to the voltage across the linear pass element. Furthermore, the power dissipation may be decreased towards the end of the charge cycle if a particular maximum charging current is desired, such as, for example, to maintain a trickle charge.

18 Claims, 4 Drawing Sheets

5,576,609

CONSTANT POWER DISSIPATION CONTROL OF A LINEAR PASS ELEMENT USED FOR BATTERY CHARGING

FIELD OF THE INVENTION

The present invention relates to battery chargers, and more particularly to a method and apparatus for maintaining the power dissipation of a linear pass element to a relatively constant level.

DESCRIPTION OF THE RELATED ART

Personal computer systems typically include one or more rechargeable batteries for providing power in circumstances where external power is unavailable or otherwise removed. For example, a desktop computer might include a chargeable lithium-based stand-by battery to maintain the real-time clock (RTC) and/or a server function daughterboard when the computer is turned off or when the A/C power source is removed. A portable computer system, such as a laptop or a notebook computer, often includes a relatively large, rechargeable, primary battery for powering the computer in areas where A/C power is unavailable. A portable computer may also include a lithium-type stand-by battery for providing stand-by power to maintain the data contents of the main memory when a discharged, primary battery is being replaced with a fully charged battery. Thus, a lithium-type battery is a rechargeable battery typically used for providing a secondary or stand-by source of power. Since such batteries are rarely accessed or replaced, it is common to provide board level battery charge management to maintain the battery in a charged condition.

There are two primary methods of recharging batteries in electronic devices including computer systems. The first is a switch-mode method, using a switching regulator or the like, which is used for voltage and current charging functions. The switch-mode method is preferred when it is necessary to limit heat generation to a minimal level. Such switch mode battery chargers are usually complex, relatively expensive and are often used for precise charging of the primary battery of a portable computer.

The second method uses a linear pass element, which is much simpler and less expensive than the switch mode method. A battery charger using a linear pass element is predominantly used for trickle charge applications, where the charge current is limited to prevent substantial temperature increase of the battery. The method using a linear pass element is desired due to simplicity of design and lower cost, but suffers from a thermal management versus charge current amplitude trade-off. As described below, this trade-off results in a longer time to trickle charge the battery than otherwise possible.

The linear pass element is coupled in the charge path of the battery between a voltage source and ground for controlling the charging current. A bipolar transistor is often the preferred power semiconductor for implementing the pass element, since it is relatively easy to implement and inexpensive. A charge current sensor, such as a series sense resistor, provides a signal indicative of charge current to a current control circuit that drives the pass element in such a manner to maintain a constant charge current. In this scheme, the level of charge current that the pass element delivers is independent of the voltage across the pass element. Since the linear pass element is in series with the battery, and since the voltage source provides a relatively constant voltage, the voltage across the pass element is at a maximum when the battery is fully discharged and decreases as the battery voltage increases.

Such constant or fixed current battery chargers present thermal design limitations for most PC applications. For example, if a battery charger design uses a simple surface-mounted power transistor provided on a printed circuit board (PCB) as the pass element, it is highly advantageous to provide little or no heat sinking to remove heat from the surface-mounted transistor. In this manner, the power and thermal dissipation of the transistor is limited by the manner in which it is mounted, as well as the associated PCB thermal conductivity. In such fixed current pass element applications, the maximum voltage applied across the pass element must be considered when selecting the maximum allowable charge current. Since thermal dissipation in an element is directly related to the power applied to the element, which is equal to the voltage across multiplied by the current through the element, the maximum charging or "safe" current is determined by the maximum desired power dissipation of the pass element divided by its highest voltage level, which occurs when the battery is fully discharged.

It is therefore noted that the constant current level controlled by the linear pass element in the battery charger results in a constantly decreasing power consumption and thermal dissipation as the voltage across the pass element decreases in response to the rising battery voltage. It is desired to provide a method for increasing the charge current to maintain a relatively constant power consumption of the pass element to thereby trickle charge the battery as fast as possible.

SUMMARY OF THE INVENTION

A battery charger using a linear pass element according to the present invention includes a control system including a charge current sensor, a voltage sensor for monitoring the voltage of the linear pass element and a constant dissipation amplifier, where the control system maintains a relatively constant power dissipation of the pass element while trickle charging a battery. The current sensor provides a voltage signal indicative of the charge current. A voltage sensor is coupled to detect the voltage of the linear pass element and to provide a signal indicative thereof. The constant dissipation amplifier compares the voltage and current signals and controls the pass element so that as the voltage across the linear pass element decreases, the charging current is increased to maintain a constant power characteristic. In this manner, the charge current is continually increased up to a maximum level allowed based on thermal dissipation limits, so that the battery is charged at the highest possible trickle rate.

A voltage sensor and feedback circuit is usually provided to compare the battery voltage to a maximum reference level and turn off the linear pass element when the battery is fully charged. In the preferred embodiment, the battery voltage sensor is also used to provide an indirect indication of the voltage across the linear pass element. Thus, only one voltage sensor is needed to perform both functions. Since the voltage of the current sensor is minimal and since the primary voltage source is relatively constant, the voltage across the linear pass element is inversely proportional to the voltage of the battery. In this manner, signals indicative of the battery charge current and the battery voltage are provided to a constant dissipation amplifier for controlling the pass element to maintain an inverse relationship between voltage across and current through the pass element. In particular, the amplifier increases the charge current as the battery voltage increases to maintain the power dissipation of the pass element.

In the preferred embodiment, the voltage of the battery is divided to a normalized level and provided to a voltage follower. The output of the voltage follower is provided to a summing junction, which is provided to the inverting input of a differential amplifier. The summing junction further changes the slope of the battery voltage signal to correspond to the charge current, so that power is relatively constant during initial stages but is decreased when the charging current approaches a maximum trickle level. The voltage across the series current sense resistor is amplified to a normalized level and provided to the non-inverting input of the differential amplifier, which provides an output for controlling the linear pass element. The linear pass element is preferably a bipolar transistor having its base receiving the output of the differential amplifier. In this manner, as the voltage of the battery increases, the differential amplifier increases the charging current to a maximum trickle level while the battery is being charged. Also, an analog switch limits the discharge of the battery when the primary voltage source is not connected.

It is now appreciated that a method and apparatus for constant power dissipation of a linear pass element used for battery charging provides a way to maintain maximum or constant power dissipation of the linear pass element to achieve maximum trickle charging current through the battery. In this manner, the battery is trickle charged as fast as possible using a linear pass element while the power dissipation of the linear pass element is limited to the maximum desired level.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
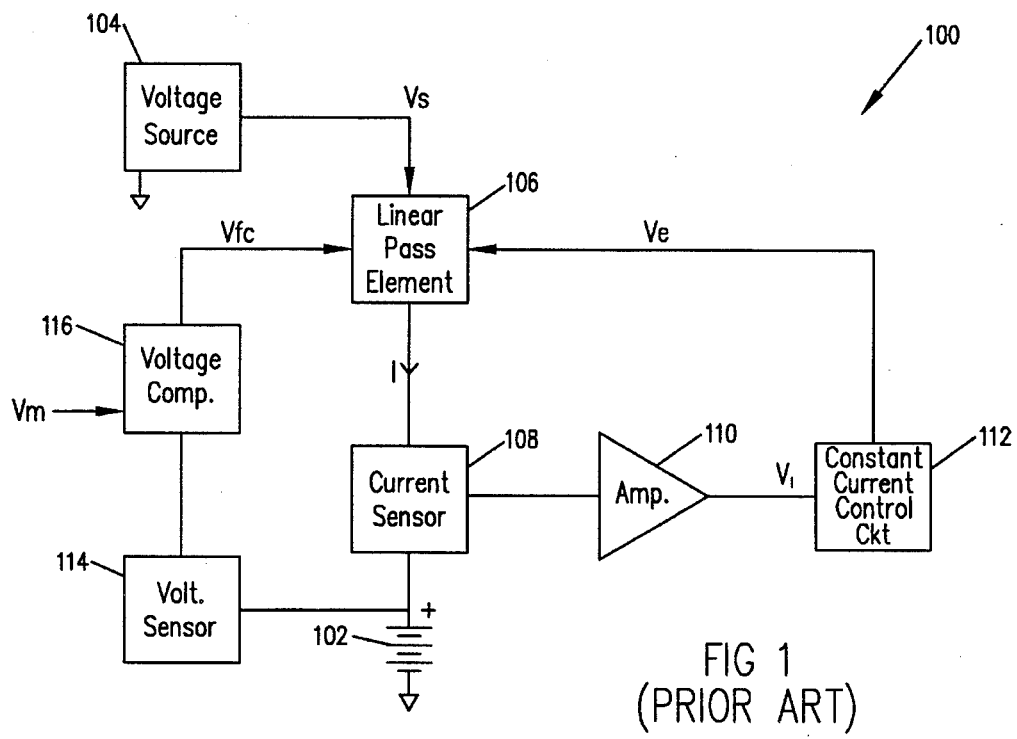
FIG. 1 is a simplified block diagram of a battery charger according to prior art.

Referring now to FIG. 1, a simplified block diagram is shown of a battery charger 100 implemented according to prior art. The battery charger 100 is commonly found in computer systems for charging a lithium-type battery 102 used as a stand-by source of power. It is noted that the present invention is not limited to lithium-type batteries or stand-by batteries in general, but may also be applied to any type of battery charging system for electronic devices. A voltage source signal referred to as $V_S$ is applied to one end of a linear pass element 106. The linear pass element 106 is coupled in series with a current sensor 108 and the battery 102 between the $V_S$ signal and ground. The charge current into the battery 102 is referred to as a signal I. The current sensor 108 is typically connected to an amplifier 110 for providing a charge current signal, referred to as $V_I$, to a constant current control circuit 112. The current control circuit 112 compares the measured charge current to a constant voltage reference, referred to as $V_{REF}$, for providing an error signal $V_E$ for controlling the linear pass element 106.

As is common in prior art, the current control circuit 112 controls the linear pass element 106 to maintain a constant trickle charge current to the battery 102. The charging current I is calculated using the maximum desired power dissipation of the linear pass element 106, the $V_S$ signal and the voltage range of the battery 102. Assuming the $V_S$ signal is approximately 12 volts (V) and the battery 102 ranges from a discharge voltage of 4 V to a fully charged voltage of approximately 8 V, and further assuming that a maximum power dissipation of 1 watt is desired in the linear pass element 106, the maximum charge current is approximately 110 mA. Assuming the voltage across the current sensor 108 is negligible, the charge current I is calculated as the power (1 watt) divided by the maximum voltage across the linear pass element (12−4=8 V), which equals about 125 mA. However, as the battery 102 charges, its voltage increases so that the voltage across the linear pass element consequently decreases. Since the charge current I remains relatively constant at 125 mA, the power dissipation of the linear pass element 106 linearly decreases to approximately 0.5 watts when the battery 102 is fully charged. This is derived as the voltage across the linear pass element 106 (12 V−8 V=4 V at full charge) multiplied by a charge current of 125 mA. Thus, the power dissipation of the linear pass element 106 is decreased even though it is capable of dissipating 1 watt.

It is noted that the battery charger 100 further includes a voltage sensor 114 coupled to the battery 102 for monitoring battery voltage and providing a signal indicative thereof to a voltage comparator 116. The voltage comparator 116 compares the battery voltage to a maximum voltage reference signal, referred to as $V_M$, for providing a control signal $V_{FC}$ to the linear pass element 106. In particular, the voltage comparator 116 asserts the $V_{FC}$ signal to turn off the linear pass element 106 when the battery 102 is fully charged.

Figure 2:
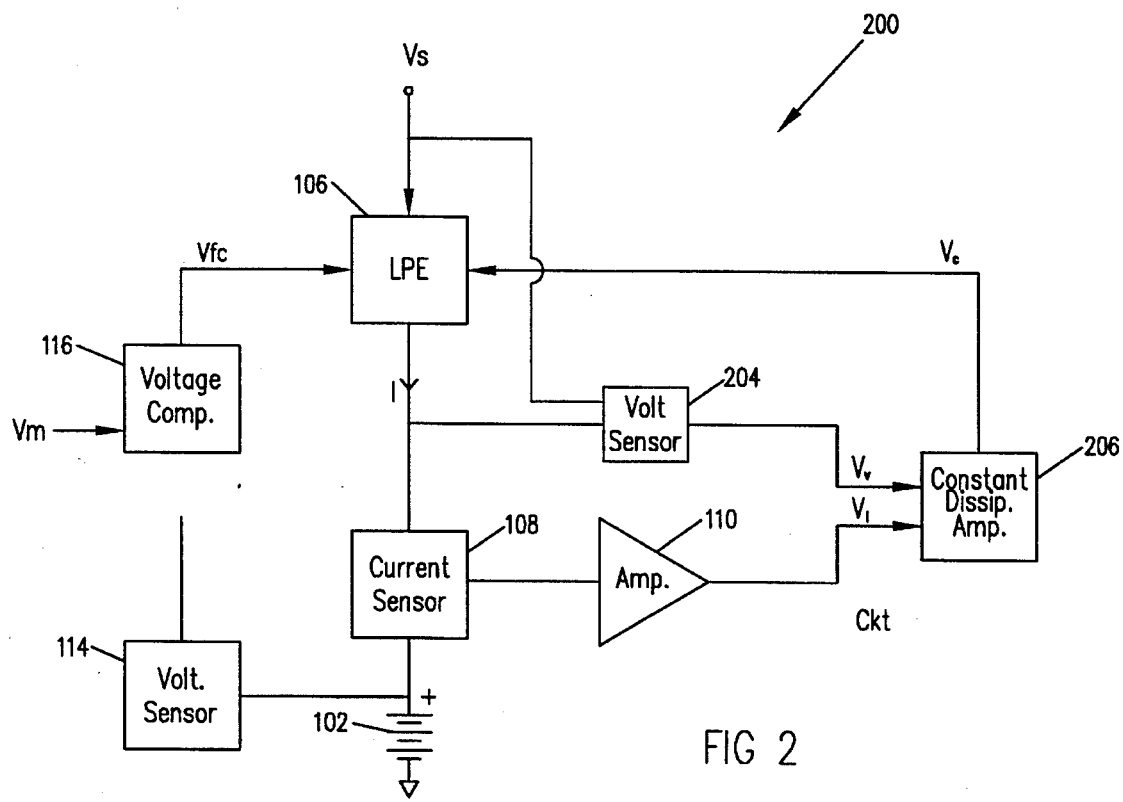
FIG. 2 is one embodiment of a battery charger including constant power dissipation control according to the present invention.

Referring now to FIG. 2, a simplified block diagram is shown of a battery charger 200 implemented according to the present invention. Similar components as that of the battery charger 100 are shown with identical reference numbers. Again, the linear pass element (LPE) 106 is coupled in series with the current sensor 108 and the battery 102 between the $V_S$ signal and ground. The voltage sensor 114 and voltage comparator 116 are provided for monitoring the voltage of the battery 102 to turn off the LPE 106 when the battery 102 is fully charged. The amplifier 110 monitors the charge current I and provides the $V_I$ signal as before. A voltage sensor 204 is connected across the LPE 106 for providing a voltage signal $V_V$ indicative of the voltage across the LPE 106. The $V_V$ and $V_I$ signals are provided to a constant dissipation amplifier 206, which asserts a signal $V_C$ for controlling the LPE 106 to thereby control the charge current I. For purposes of the present invention, the amplifier 206 asserts the $V_C$ signal in such a manner to proportionately increase the charge current I as the voltage across LPE 106 is decreased. Thus, since the $V_S$ signal is constant, as the $V_V$ signal decreases while the battery 102 charges, the amplifier 206 asserts the $V_C$ signal to the LPE 106 to increase the charge current I and thus the $V_I$ signal in such as manner that the voltage across, multiplied by the current through, the LPE 106 is maintained at a constant level.

Figure 3:
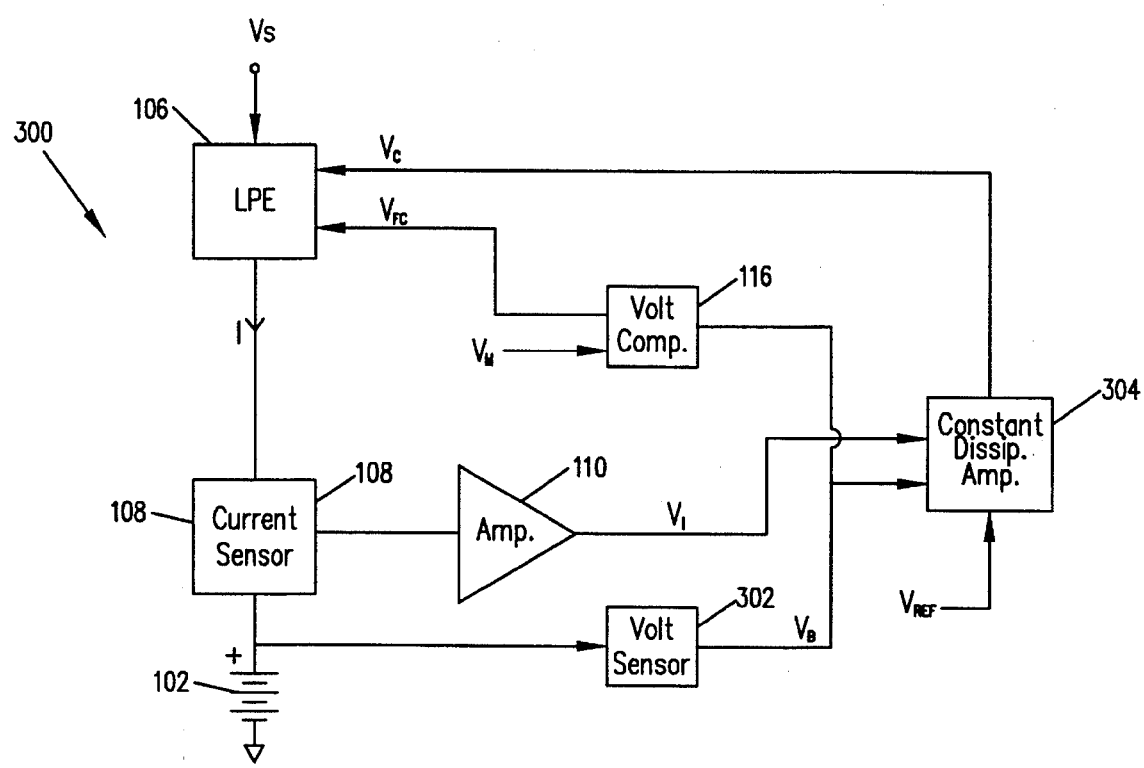
FIG. 3 is a simplified block diagram of another embodiment of a battery charger according to the present invention.

Referring now to FIG. 3, a simplified block diagram is shown of another battery charger 300 implemented according to the present invention. Again, the LPE 106, the current sensor 108 and the battery 102 are coupled in series between the $V_S$ signal and ground. The amplifier 110 functions in a similar manner as described above. However, the voltage sensors 204, 114 are combined into a single voltage sensor 302, which asserts a signal $V_B$ indicative of the battery voltage to the voltage comparator 116 and to a constant dissipation amplifier 304. It is noted that the voltage comparator 116 operates in a similar manner to terminate the charge current I when the battery 102 is fully charged. However, the voltage sensor 302 also indirectly measures the voltage across the LPE 106 since the $V_S$ signal is relatively constant and since the voltage across the current sensor 108 is relatively small. Thus, the voltage across the LPE 106 is inversely proportional to the $V_B$ signal. The amplifier 304 in this embodiment asserts the $V_C$ signal to increase the charge current I to the battery 102 in response to an increase of the $V_B$ signal. Thus, as the voltage of the battery 102 rises, and thus as the voltage across the LPE 106 decreases, the amplifier 304 increases the charge current I to maintain a constant power dissipation of the LPE 106.

Figure 4:
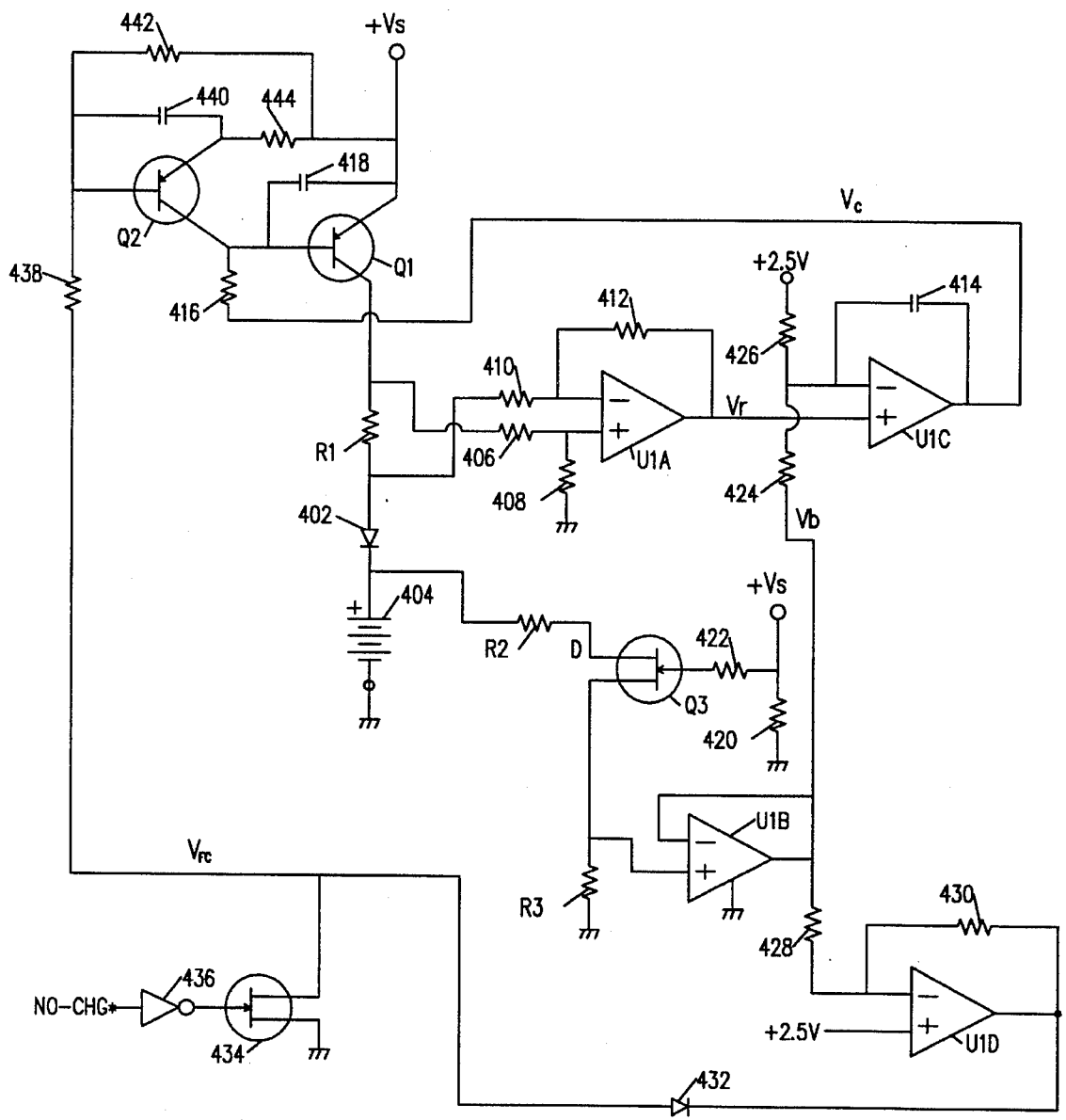
FIG. 4 is a detailed schematic diagram of a battery charger similar to that shown in FIG. 3.

Referring now to FIG. 4, a more detailed schematic diagram is shown of a battery charger 400 implemented in a similar manner as the battery charger 300. The $V_S$ signal is applied to the emitter of a bipolar transistor Q1, having its collector connected to one end of a current sense resistor R1. The transistor Q1 is preferably a pnp bipolar transistor, although other suitable transistors are sufficient. A capacitor 418 is connected between the base and emitter of the transistor Q1. The transistor Q1 serves as the linear pass element 106 described previously. The transistor Q1 is preferably a surface-mounted power transistor on a PCB where little or no heat sinking is provided so that its thermal dissipation is somewhat limited. The resistor R1 preferably has a relatively low resistance, such as a few ohms, in order to prevent significant power loss and also to avoid significant voltage drop. Nonetheless, a significant voltage drop does develop across the resistor R1 at higher charge currents. In the preferred embodiment, the resistor R1 is 3.6Ω.

The other end of the sense resistor R1 is connected to the anode of a diode 402, having its cathode connected to the positive terminal of a rechargeable battery 404, which has its negative terminal connected to ground. The battery 404 is preferably a lithium-ion type battery having two series cells obtaining a full charge voltage of approximately 8.4 V, a discharged voltage of 5.4 V and a completely discharged voltage of approximately 4 V. The diode 402 serves to prevent discharge of the battery 404 into the control circuitry when $V_S$ is not connected.

The junction between the collector of the transistor Q1 and the resistor R1 is provided to one end of a resistor 406, which has its other end connected to a resistor 408 and to the non-inverting input of an amplifier U1A. The other end of the resistor 408 is connected to ground. The anode of the diode 402 is connected to one end of a resistor 410, having its other end connected to the inverting input of the amplifier U1A and to one end of a feedback resistor 412. The other end of the feedback resistor 412 is connected to the output of amplifier U1A, which provides the $V_I$ signal. In a preferred embodiment, the resistors 408 and 412, and the resistors 406 and 410 are chosen to amplify the voltage across the resistor R1 by approximately 2.5 to develop the $V_I$ signal.

The output of the amplifier U1A is provided to the non-inverting input of an amplifier U1C, which has a capacitor 414 connected between its inverting input and its output, where the amplifier U1C, develops the $V_C$ signal at its output. The $V_C$ signal is provided to one end of a current limit resistor 416, having its other end connected to the base of the transistor Q1.

The positive terminal of the battery 404 is provided to one end of a resistor R2, having its other end connected to the drain of a field-effect transistor (FET) Q3. The source of FET Q3 is connected to one end of a resistor R3, having its other end connected to ground. The $V_S$ signal is provided to one end of a resistor 420 and to one end of a resistor 422, where the other end of the resistor 420 is connected to ground and the other end of the resistor 422 is provided to the gate of the FET Q3. The source of the FET Q3 is provided to the non-inverting input of a voltage follower amplifier U1B, having its inverting input connected to its output for developing the $V_B$ signal. The $V_B$ signal is provided to one end of a resistor 424, having its other end coupled to the inverting input of the amplifier U1C and to one end of a resistor 426. The other end of the resistor 426 is connected to a reference voltage $V_{REF}$, which is preferably 2.5 volts.

The output of the amplifier U1B is connected to one end of a resistor 428, having its other end connected to the inverting input of an amplifier U1D and to one end of a feedback resistor 430. The other end of the resistor 430 is connected to the output of amplifier U1D, which receives the $V_{REF}$ signal at its non-inverting input. The output of the amplifier U1D is connected to the cathode of a diode 432, having its anode connected to the drain of a FET 434, having its source connected to ground. The gate of FET 434 is connected to the output of an inverter 436, which receives a digital signal NO-CHG* at its input. The amplifiers U1A, U1B, U1C and U1D are all preferably the LM 324 operational amplifier, although other suitable operational amplifiers can be used.

The anode of the diode 432 is also connected to one end of a resistor 438, having its other end connected to the base of a transistor Q2, to one end of a capacitor 440 and to one end of a resistor 442. The other end of capacitor 440 is connected to the emitter of the transistor Q2 and to one end of a resistor 444, having its other end connected to the other end of the resistor 442, which is further connected to the $V_S$ signal. The collector of the transistor Q2 is provided to the base of transistor Q1.

Operation of the battery charger 400 is now described. When the $V_S$ signal is connected and the battery 404 is not fully charged, a charge current I begins to flow into the battery 404 as controlled by the transistor Q1. The transistor Q3 is activated when the $V_S$ signal is connected, but operates as a unidirectional analog switch to limit discharge of the battery 404 via the resistor R2 when the primary power $V_S$ is not connected. The resistors R2 and R3 divide the battery voltage to a level based on 2.5 V, so that the voltage into the amplifier U1B is approximately 2.5 V when the battery voltage is 8.4 V at full charge. The amplifier U1B buffers the divided voltage and asserts the $V_B$ signal, which is provided to a summing junction comprising resistors 426 and 424. The resistors 426 and 424 normalize the $V_B$ signal to correspond to the $V_I$ signal. For example, the resistor 424 could be about 2 Ω and the resistor 426 could be 8.45 kΩ to achieve the desired function. In this manner, the voltage at the inverting input of the amplifier U1C ranges between approximately 1.4 V to 2.5 V when the battery voltage ranges between 3 to 8.4 V, respectively.

The charging current I develops a voltage across sense resistor R1, which is amplified through amplifier U1A providing the $V_I$ signal. In the particular embodiment shown, 1 V across the resistor R1 corresponds to 2.5 V at the $V_I$ signal, which corresponds to a charging current of approximately 278 mA when the battery 404 is fully charged. The constant dissipation amplifier U1C controls the transistor Q1 and thus the charging current to increase the charging current I as the battery voltage increases.

Although the present invention is not limited to any particular charging rate, it is desired to charge the battery 404 at the fastest possible trickle rate while limiting the power dissipation of the linear pass device, which is the transistor Q1 in FIG. 4, to a maximum level. A trickle rate is sufficient to charge the battery 404 without generating a significant amount of heat by the battery 404, such as might occur during fast charging. It is also noted that although the charge current I is increased linearly with the battery voltage, a certain increasing voltage develops across the resistor R1 and the diode 402 so that the power curve of the transistor Q1 is not necessarily linear. In fact, the power remains relatively constant while charging from 4 V to 6 V, but then begins to decrease. This is desirable, however, since the charging current I begins to approach the maximum desired trickle rate towards the end of the charging cycle. The resistors 426, 424 effectively modify the slope of the charging current versus battery voltage to allow relatively constant power dissipation of the transistor Q1 at the beginning of the charge cycle and yet obtain maximum trickle current towards the end of the charge cycle.

Figure 5:
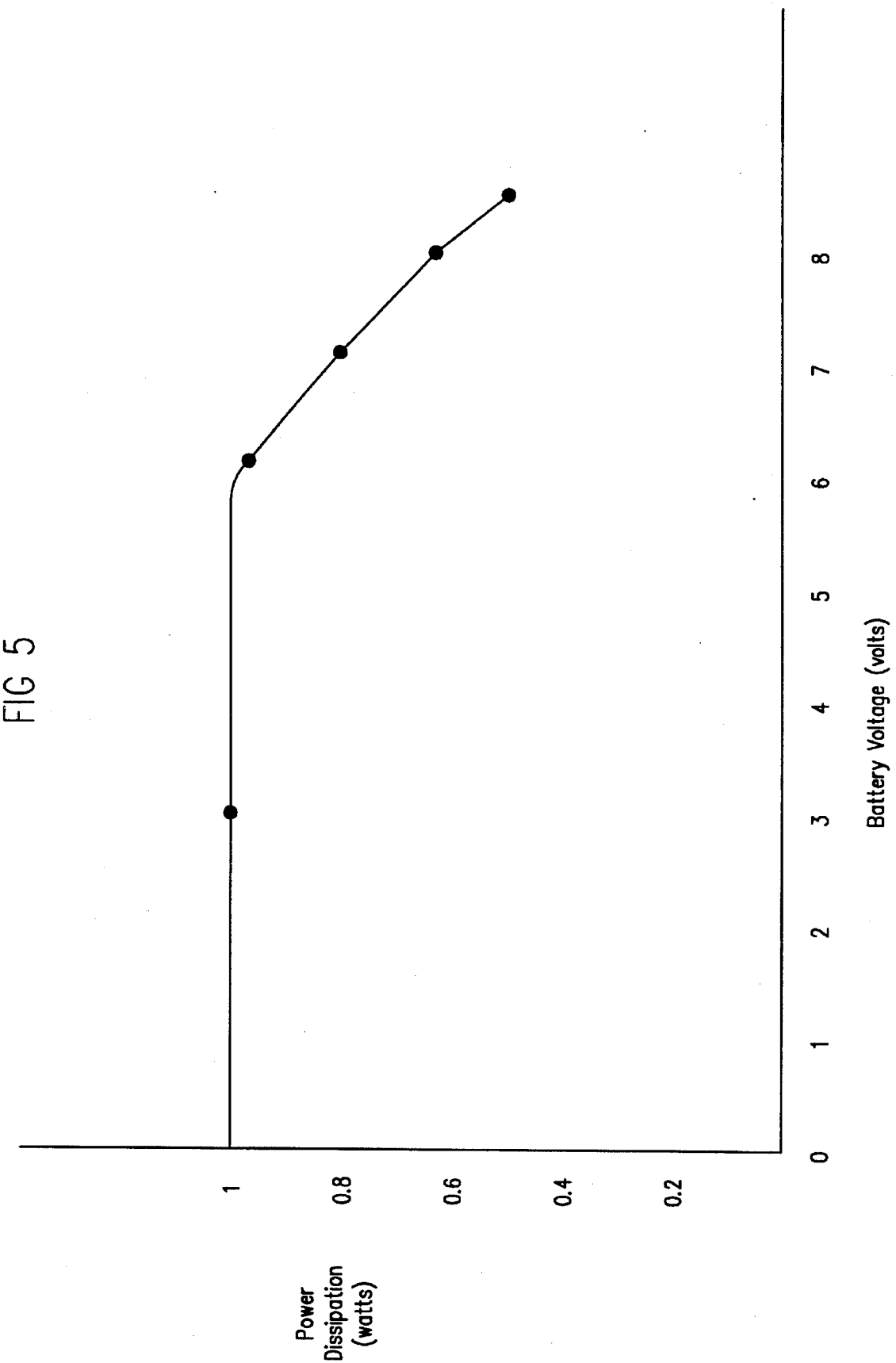
FIG. 5 is a graph of power dissipation versus battery voltage of the battery charger of FIG. 4.

FIG. 5 is a graph illustrating power dissipation of the transistor Q1 versus battery voltage. In particular, when a fully discharged battery 404 is being charged, its voltage is 4 V and the charging current I is regulated at approximately 160 mA. Approximately 1 V develops across the resistor R1 and the diode 402 so that the voltage across the transistor Q1 is slightly less than 7 V. The power dissipation of transistor Q1 is therefore 7 V multiplied by 160 mA, which is approximately 1 watt. When the battery 404 reaches a voltage of 6 V, the amplifier U1C controls the transistor Q1 to provide a charging current I of approximately 213 mA. Thus, assuming a voltage of approximately 1.4 V across the diode 402 and the resistor R1, the voltage across the transistor Q1 is approximately 4.6 V. The power dissipation of the transistor Q1 is therefore 4.6 V multiplied by 213 mA, which, again, is approximately 1 watt. At a battery voltage of 7 V, the power dissipation of the transistor Q1 falls to 0.85 watts corresponding to a charge current of 240 mA. When the battery 404 reaches a full charge voltage of 8.4 V, the amplifier U1C controls the transistor Q1 to provide a charging current of approximately 278 mA. Assuming a voltage across the resistor R1 and the diode 402 is approximately 1.6 V, the voltage across the transistor Q1 is 2 V. Thus, the power dissipation of the transistor Q1 is 2 V multiplied by 278 mA which is approximately 560 milliwatts.

The amplifier U1D is a charge cut off detector. Once the battery 404 reaches full voltage, the amplifier U1D turns on the transistor Q2, which correspondingly turns off the transistor Q1 and thus shuts off the charging current to the battery 404. The charging current may also be turned off through software through the NO-CHG* signal, which, when asserted low, turns on the FET 434 and thus turns on the transistor Q2, turning off the transistor Q1.

It is now appreciated that a battery charger according to the present invention maintains a relatively constant power dissipation of the linear pass element controlling charge current to allow charging current to increase while the battery voltage increases. This allows a battery to be charged at a maximum trickle rate while limiting the power dissipation of the linear pass element to a maximum level. Thus, the present invention provides superior and more efficient performance for charging a battery using the linear pass element method. In the preferred embodiment, the power dissipation may be decreased towards the end of the charge cycle if a maximum charge current is desired. This is advantageous when desiring to maintain charging current at a maximum trickle level.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A control system for maintaining constant power dissipation of a linear pass element of a battery charger for charging a battery, comprising:

a current sensor coupled to sense the charge current of the battery;

a voltage sensor coupled to sense the voltage of the linear pass element; and an amplifier coupled to said current sensor and said voltage sensor for controlling the linear pass element so that the power dissipation of the linear pass element remains relatively constant.

2. The control system of claim 1, wherein the linear pass element comprises a transistor having a current path coupled in the charge path of the battery and a control terminal for controlling charge current, wherein said amplifier has an output for coupling to the control terminal of the transistor.

3. The control system of claim 1, wherein the linear pass element comprises a bipolar transistor surface-mounted on a PCB.

4. The control system of claim 1, wherein said current sensor comprises:

a resistor coupled in the charge path of the battery; and an amplifier coupled to said resistor for providing a voltage signal indicative of the charge current.

5. The control system of claim 1, wherein said voltage sensor is coupled to measure the voltage across the linear pass element.

6. A control system for maintaining maximum power dissipation of a linear pass element of a battery charger for charging a battery receiving charge power from a relatively constant voltage source, comprising:

a current sensor coupled to sense the charge current of the battery;

a voltage sensor coupled to sense the battery voltage; and an amplifier coupled to said current sensor and said voltage sensor for controlling the linear pass element to increase the charge current as the battery voltage increases so that the power dissipation of the linear pass element remains relatively constant.

7. The control system of claim 6, further comprising:

a voltage divider coupled to said voltage sensor for providing a normalized signal indicative of the battery voltage to control the charging current to desired levels from when the battery is discharged to when the battery is fully charged.

8. The control system of claim 7, wherein the power dissipation of the linear pass element is decreased towards the end of a charge cycle when the charge current approaches a maximal level.

9. A battery charger for charging a battery, comprising:

a voltage source for providing a relatively constant supply voltage;

a linear pass element coupled in series with said voltage source and the battery for controlling charge current;

a current sensor coupled to measure said charge current;

a voltage sensor coupled to measure the voltage of the battery; and a control amplifier coupled to said current and voltage sensors and said linear pass element for increasing said charge current while the battery voltage increases so that the power dissipation of said linear pass element is maintained at or below a predetermined maximum level.

10. The battery charger of claim 9, wherein said linear pass element comprises a bipolar transistor surface-mounted on a printed circuit board.

11. The battery charger of claim 9, wherein said current sensor comprises:

a resistor coupled in the charge path of the battery; and a second amplifier coupled to said resistor for providing a signal indicative of said charge current.

12. The battery charger of claim 11, wherein said voltage sensor comprises:

a voltage divider coupled across the battery; and a buffer coupled to said resistive voltage divider for providing a signal indicative of the battery voltage.

13. The battery charger of claim 12, wherein said control amplifier receives said signal indicative of charge current and said signal indicative of the battery voltage for providing a signal for controlling said linear pass element.

14. The battery charger of claim 13, further comprising:

a reference summing junction coupled between said voltage sensor and said amplifier for normalizing the battery voltage level to control the charge current to appropriate levels throughout the charge cycle.

15. The battery charger of claim 12, further comprising:

said voltage source being removably connected; and a switch circuit coupled to said voltage divider and for detecting said voltage source for terminating charge current when said voltage source is not connected.

16. The battery charger of claim 15, wherein said switch circuit comprises:

a second voltage divider for coupling to said voltage source; and a transistor coupled to said second voltage divider for disabling said voltage divider coupled across the battery when said voltage source is disconnected.

17. The battery charger of claim 9, further comprising:

a charge termination circuit coupled to said voltage sensor and said linear pass element to terminate said charge current when the battery voltage reaches a full charge level.

18. The battery charger of claim 17, wherein said charge termination circuit comprises:

a comparator coupled to said voltage sensor for comparing the battery voltage with a reference level; and a transistor circuit coupled to said comparator and said linear pass element to turn off said linear pass element when said comparator indicates full charge.

* * * * *